United States Patent
Thorne et al.

(10) Patent No.: US 7,634,460 B2
(45) Date of Patent: Dec. 15, 2009

(54) COMPUTER-IMPLEMENTED DATA REPLACEMENT GRAPHICAL USER INTERFACE SYSTEM AND METHOD

(75) Inventors: Gregory M. Thorne, Cary, NC (US); Kelly D. Pirrello, Cary, NC (US)

(73) Assignee: SAS Institute Inc., Cary, NC (US)

( * ) Notice: Subject to any disclaimer, the term of this patent is extended or adjusted under 35 U.S.C. 154(b) by 1009 days.

(21) Appl. No.: 10/186,224

(22) Filed: Jun. 28, 2002

(65) Prior Publication Data

US 2004/0002941 A1 Jan. 1, 2004

(51) Int. Cl.
*G06F 17/30* (2006.01)
(52) U.S. Cl. .................. 707/3; 707/102; 707/104.1
(58) Field of Classification Search .............. 707/102, 707/3, 104.1
See application file for complete search history.

(56) References Cited

U.S. PATENT DOCUMENTS

| | | | |
|---|---|---|---|
| 5,418,950 A | 5/1995 | Li et al. | |
| 5,832,481 A | 11/1998 | Sheffield | |
| 5,899,990 A | 5/1999 | Maritzen et al. | |
| 5,918,224 A | 6/1999 | Bredenberg | |
| 5,924,089 A * | 7/1999 | Mocek et al. | 707/4 |
| 5,987,455 A * | 11/1999 | Cochrane et al. | 707/4 |
| 5,987,465 A | 11/1999 | Kleewein et al. | |
| 6,003,026 A | 12/1999 | Bonzi | |
| 6,115,704 A * | 9/2000 | Olson et al. | 707/3 |
| 6,282,551 B1 | 8/2001 | Anderson et al. | |
| 6,317,750 B1 | 11/2001 | Tortolani et al. | |
| 6,381,595 B1 | 4/2002 | Kleewein et al. | |
| 6,480,857 B1 * | 11/2002 | Chandler | 707/100 |
| 6,539,371 B1 * | 3/2003 | Bleizeffer et al. | 707/2 |
| 6,574,637 B1 * | 6/2003 | Lindsey | 707/104.1 |
| 6,578,028 B2 * | 6/2003 | Egilsson et al. | 707/2 |
| 6,633,885 B1 * | 10/2003 | Agrawal et al. | 707/102 |
| 6,640,221 B1 * | 10/2003 | Levine et al. | 707/3 |
| 6,681,227 B1 * | 1/2004 | Kojima et al. | 707/10 |
| 6,760,719 B1 * | 7/2004 | Hanson et al. | 707/3 |
| 7,092,955 B2 * | 8/2006 | Mah et al. | 707/100 |
| 2003/0056173 A1 * | 3/2003 | Copenhaver et al. | 715/513 |
| 2003/0229633 A1 * | 12/2003 | Phillips | 707/4 |
| 2004/0225639 A1 * | 11/2004 | Jakobsson et al. | 707/2 |
| 2005/0166179 A1 * | 7/2005 | Vronay et al. | 717/105 |
| 2005/0289175 A1 * | 12/2005 | Krishnaprasad et al. | 707/102 |

OTHER PUBLICATIONS

Database Performance Management, Aug. 1999, Craig S. Mullins & Associates, Inc (Craig S. Mullins).*
Database Performance Management, Craig S. Mullins & Associates, Inc. Aug. 1999; http://www.craigsmullins.com/ssu_0899.htm.*
The Power of SQL Case Statements, Scott Mitchell; http://www.4guysfromrolla.com/webtech/102704-1.shtml.*

* cited by examiner

*Primary Examiner*—Don Wong
*Assistant Examiner*—Thanh-Ha Dang
(74) *Attorney, Agent, or Firm*—Jones Day

(57) ABSTRACT

A computer-implemented graphical user interface (GUI) system and method are provided for modifying data via an SQL CASE statement. The GUI system and method displays at least one data value from results of a query, and allows a new data value to be specified. An SQL CASE statement is generated based upon the specified new data value, and a data value within the query results is modified based upon the generated SQL CASE statement.

58 Claims, 14 Drawing Sheets

COMPUTER-IMPLEMENTED DATA REPLACEMENT GRAPHICAL USER INTERFACE SYSTEM AND METHOD

TECHNICAL FIELD

The present invention relates generally to computer-implemented relational database systems and more particularly to data manipulation involving relational database systems.

BACKGROUND

In current database systems, users have to group and replace data for queries by writing CASE statements using Structured Query Language (SQL) code. Writing SQL CASE statements by hand requires users to know CASE syntax, as well as to know the data and the data's underlying structures that are to be processed. The CASE statement also has different syntaxes for different situations. For example, the CASE statement has different syntaxes depending upon whether the user is replacing discrete values and/or replacing a range of values.

SUMMARY

In accordance with the teachings provided herein, a computer-implemented graphical user interface (GUI) system and method are provided for modifying data via an SQL CASE statement. The GUI system and method displays at least one data value from results of a query, and allows a new data value to be specified. An SQL CASE statement is generated based upon the specified new data value, and a data value within the query results is modified based upon the generated SQL CASE statement.

DETAILED DESCRIPTION

Figure 1:
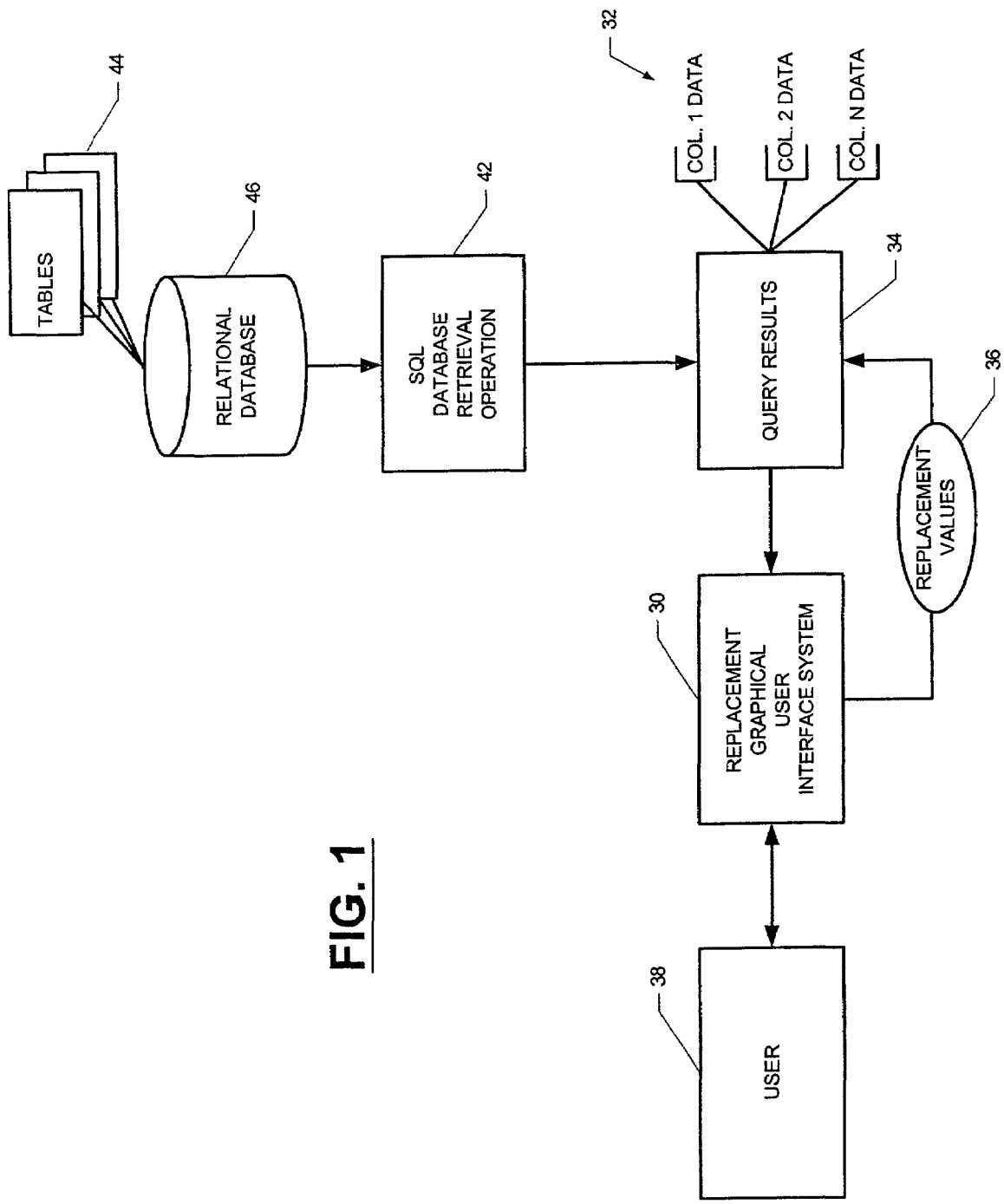
FIGS. 1-3 are block diagrams depicting software and computer components utilized in a replacement graphical user interface system.

FIG. 1 depicts at 30 a replacement graphical user interface (GUI) system. The replacement GUI system 30 allows a user-friendly way to replace data values 32 associated with query results 34 with other data values 36. A user 38 may wish to do this for a number of reasons. For example, query results 34 from a database retrieval operation 42 may contain a two letter code for each of the many departments a company might have. The replacement GUI system 30 allows a user 38 to replace within the query results 34 the two letter obscure department designations with the full names of the departments.

In the Structured Query Language (SQL), query results may be created by different types of database retrieval operations, such as an SQL SELECT statement. The SQL SELECT statement may contain a number of columns and parameters that specify which columns are to be used to generate the query results 34 and which filter parameters are to be used. It should be understood that the SQL SELECT statement may specify not only columns or parameters, but other information permitted by the ANSI SQL SELECT statement syntax.

Figure 2:
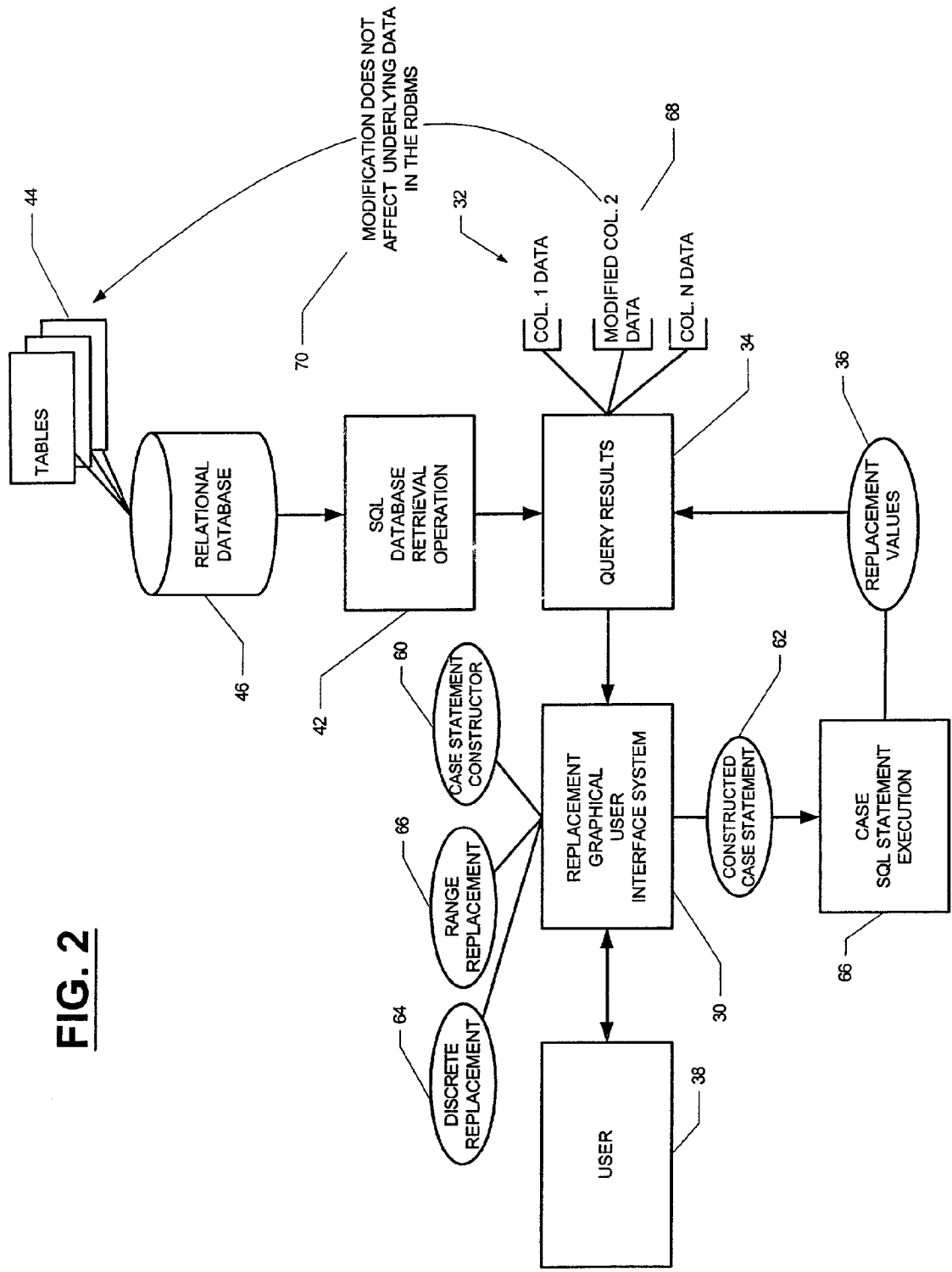

With reference to FIG. 2, the replacement GUI system 30 displays information on the current values 32 of the columns in the query results 34 which relieves the user 38 from knowing valid values prior to assigning the replacement values. The user 38 selects which data values in the query results are to be replaced through the replacement GUI system 30. The replacement GUI system 30 allows the user 38 to specify that discrete data values in the query results 34 are to be replaced and/or ranges of data values are to be replaced.

Using the data values specified in the replacement GUI system 30, an SQL CASE constructor module 60 automatically generates an SQL CASE statement 62. If a replacement operation involves replacing discrete values, then the SQL CASE constructor module 60 uses the functionality of the discrete replacement function 64 to specify the correct SQL CASE syntax for a discrete values replacement. If a replacement operation involves replacing a range of values, then the SQL CASE constructor module 60 uses the functionality of the range replacement function 66 to specify the correct SQL CASE syntax for a range replacement. It should be understood that the SQL CASE constructor module 60 may utilize either or both the functionality of the discrete replacement function 64 and/or range replacement function 66 to construct a CASE statement 62. This allows the constructed CASE statement 62 to perform either or both discrete and/or range replacement operations within the same CASE statement 62.

Execution 66 of the constructed CASE statement 62 replaces one or more of the query results' data values in accordance with what the user had specified through the GUI system 30. In this example, the constructed CASE statement 62 effects a modification of column 2's data values in the query results 34 as shown at 68. It is noted at 70 that the modification of column 2's data values does not affect the data values in the underlying table(s) 44 that were used to create the query results 34.

Figure 3:
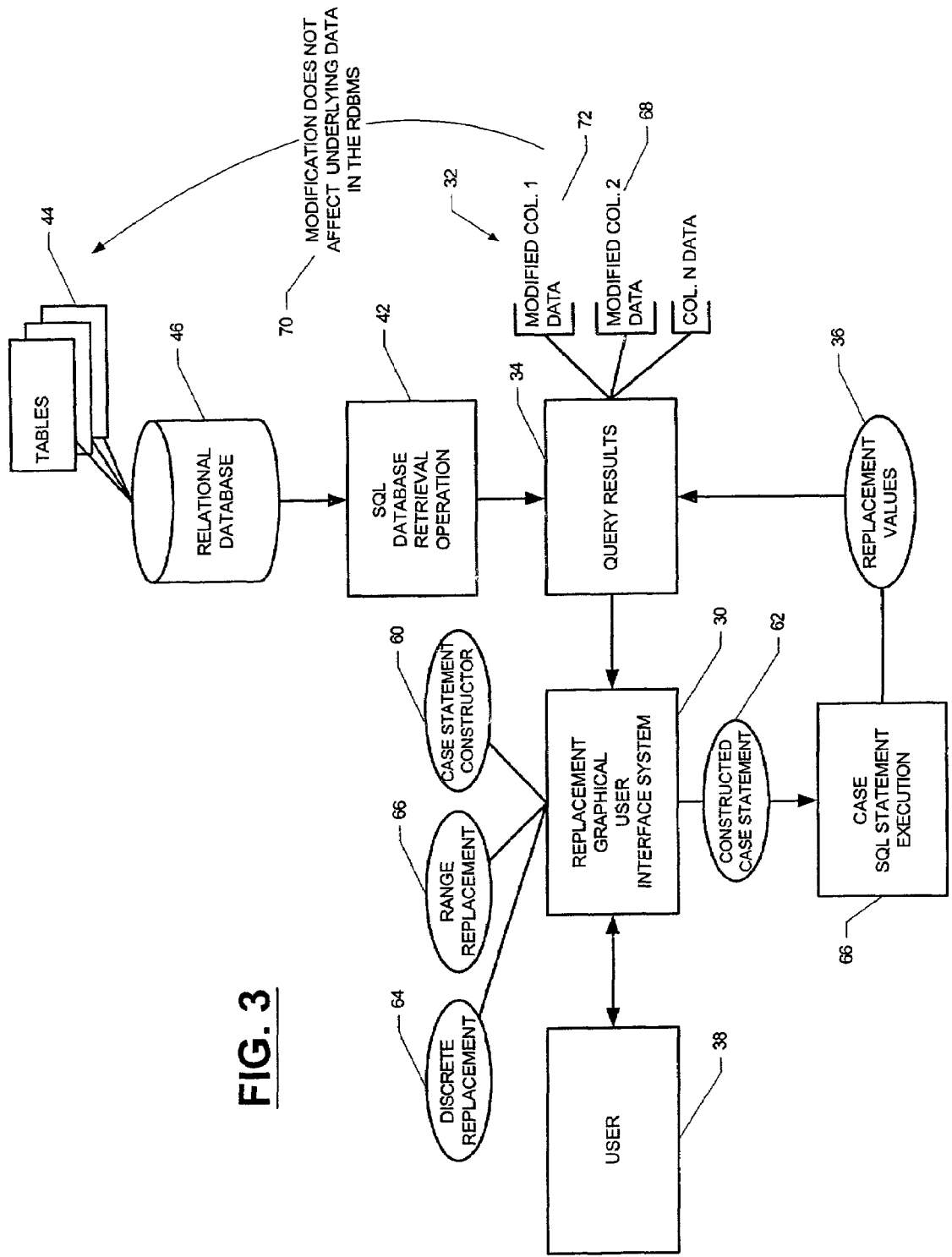

The user may elect to specify that the data values in more than one column in the query results 34 are to be modified. As shown in FIG. 3, the user has specified that data values contained in the first and second columns (68 and 72) of the query results 34 are to be replaced. The SQL CASE constructor module 60 generates a CASE statement to modify accordingly the data values contained in these columns (68 and 72).

Figure 4:
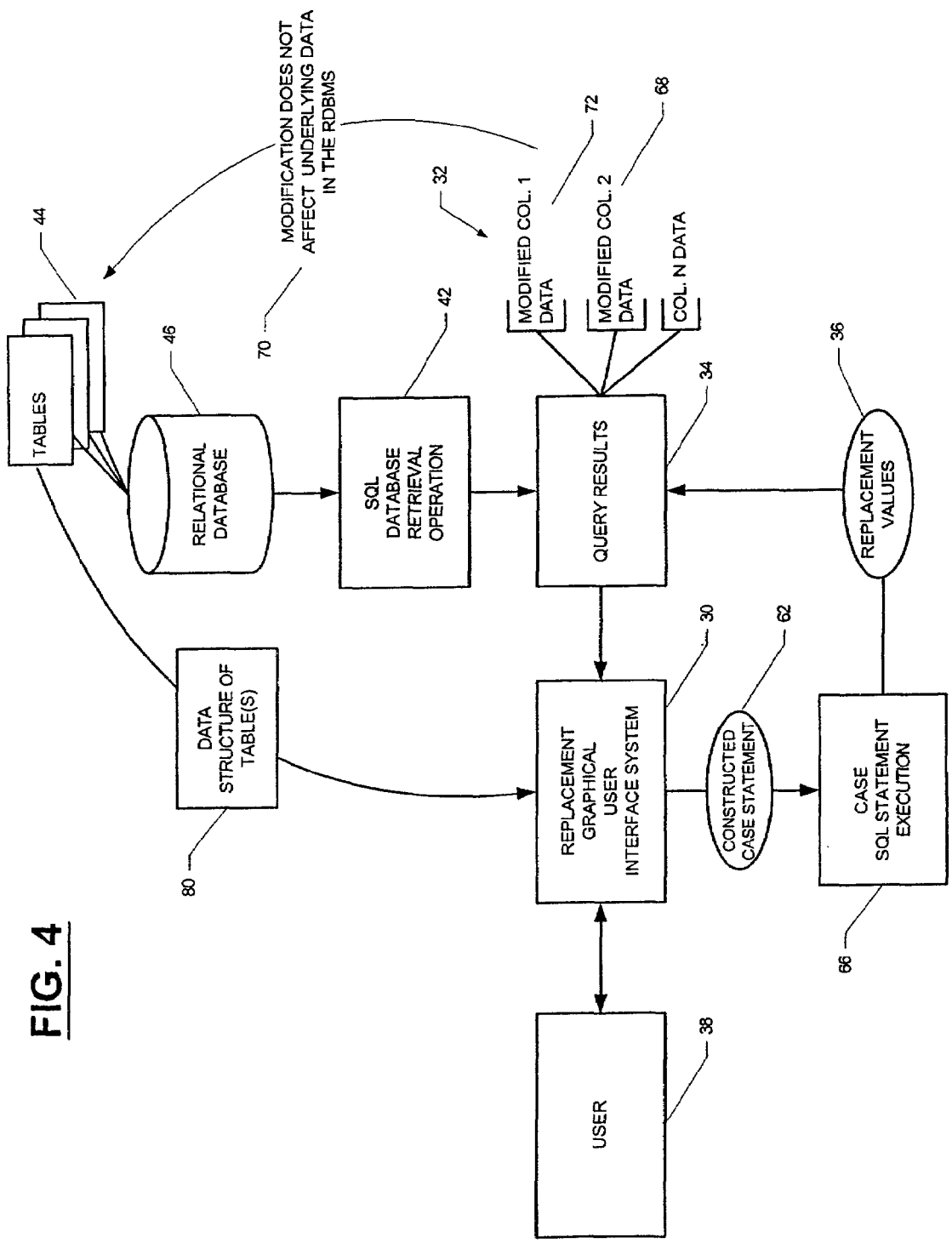
FIG. 4 is a block diagram depicting the use of data structures of underlying tables within the replacement graphical user interface system.

FIG. 4 shows that the replacement GUI system 30 may utilize the data structure(s) 80 of the underlying table(s) 44 to display what data values are available to be modified by the replacement GUI system 30 as well as to construct a CASE statement 62. To accomplish this, column data types, column interrelationships and other data structure information specified for the underlying tables 44 may be used by the replacement GUI system 30. Data structure information of the underlying tables may be useful, as an example, for providing columns for replacement, providing distinct values to be replaced, and providing column types (e.g., character, numeric, etc.).

It should be understood that many different data types and values may be replaced through the replacement GUI system 30. For example, any data that can be represented as discrete values or as ranges may be affected by the replacement GUI system 30. Such data includes text data, memo data, numeric (integer, real) data, Boolean data, yes/no data, etc.

Figure 5:
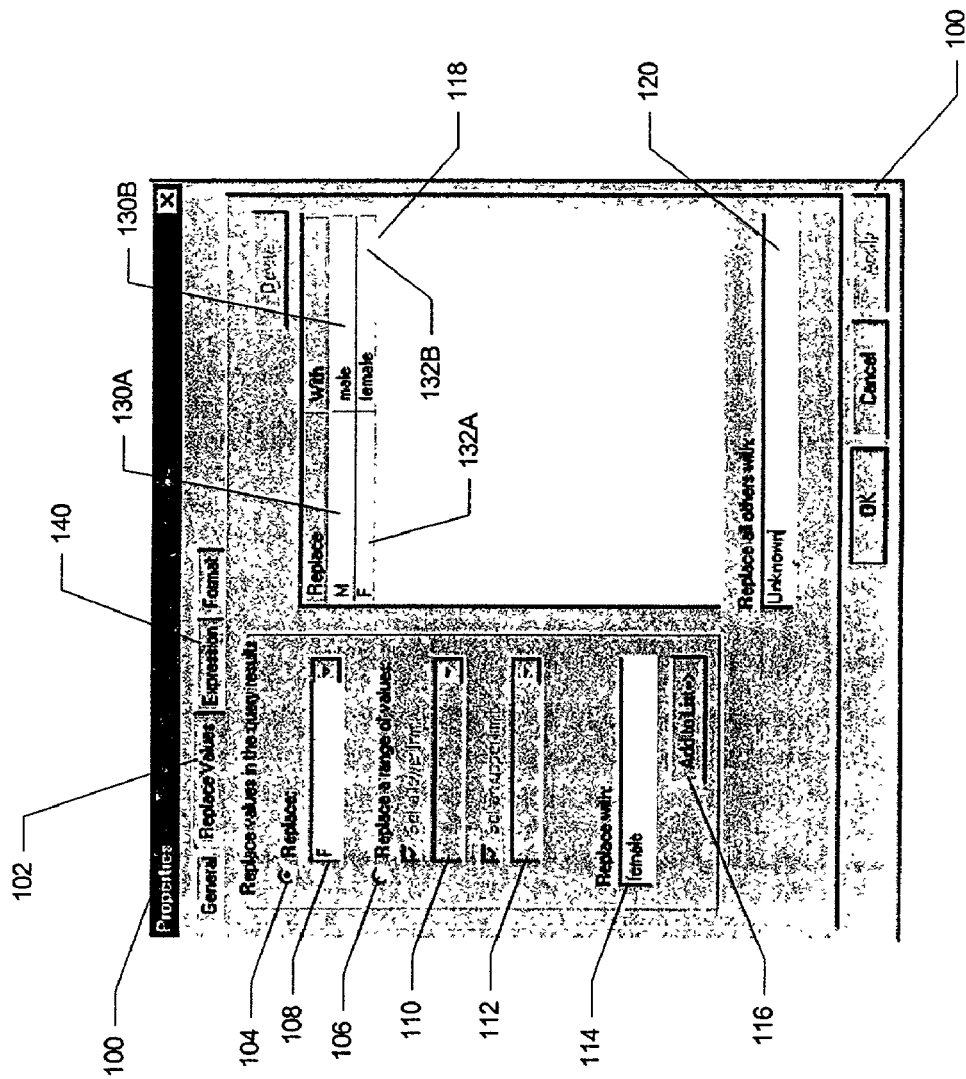
FIG. 5 is a graphical user interface illustrating an example of replacing discrete data values.

FIG. 5 depicts an example of replacing data values through a GUI 100 generated by the replacement graphical user interface system. The GUI 100 contains a number of regions wherein a user may specify what values are to be replaced and with what replacement values. It should be understood that the regions may be changed in their order or may contain different types of controls for specifying what values are to be replaced and with what replacement values. Still further the interface may be in the form of a wizard that steps a user through the process. The wizard might first request the user to specify what values are to be replaced, and then in a succeeding interface request the user to specify the replacement values.

With reference to FIG. 5, the GUI 100 in this example contains a replace values tab 102 to specify replacement information. Via the replace values tab 102, the user has a choice of replacing a discrete value or a range of values for a category of data. The user is able to do this by selecting a radio button (104 or 106) to indicate which type of replacement they prefer, and then specifying a replacement value into field 116. A user is not limited to one replacement per query.

A user accesses the values that the user wants to replace using a pull down list 108 for a discrete item replacement or using pull down lists 110 and 112 for a range replacement. The pull down lists (108, 110 or 112) contain a set of distinct values for the item. Optionally, the user can manually enter values within a pull down list field (108, 110 or 112). The user specifies at 114 the value to replace original value(s) within the query results, and then the user clicks button 116 to add the original value(s) and the replacement value(s) to the replacement list 118. The user can also specify at 120 a default value that is assigned to all columns whose values do not match any of the specified values or ranges of values.

FIG. 5 shows a replace values example where the user replaces discrete values in a column named Gender contained within the query results. The user is replacing a discrete value in the results of a query. For example, the query results contain a column named Gender with possible values of "M" and "F". The user can choose to substitute "male" 130B for values of "M" 130A and "female" 132B for values of "F" 132A in the query results. The user can type in the value that the user wants to replace or the user can select a value from the pull-down list 108. The user specifies at 114 the replacement value.

The user can also specify at 120 a default value that will be assigned to all columns whose values do not match any of the specified values. In this example, all other values (including lowercase "m" and "f") are replaced with the string "Unknown".

Figure 6:
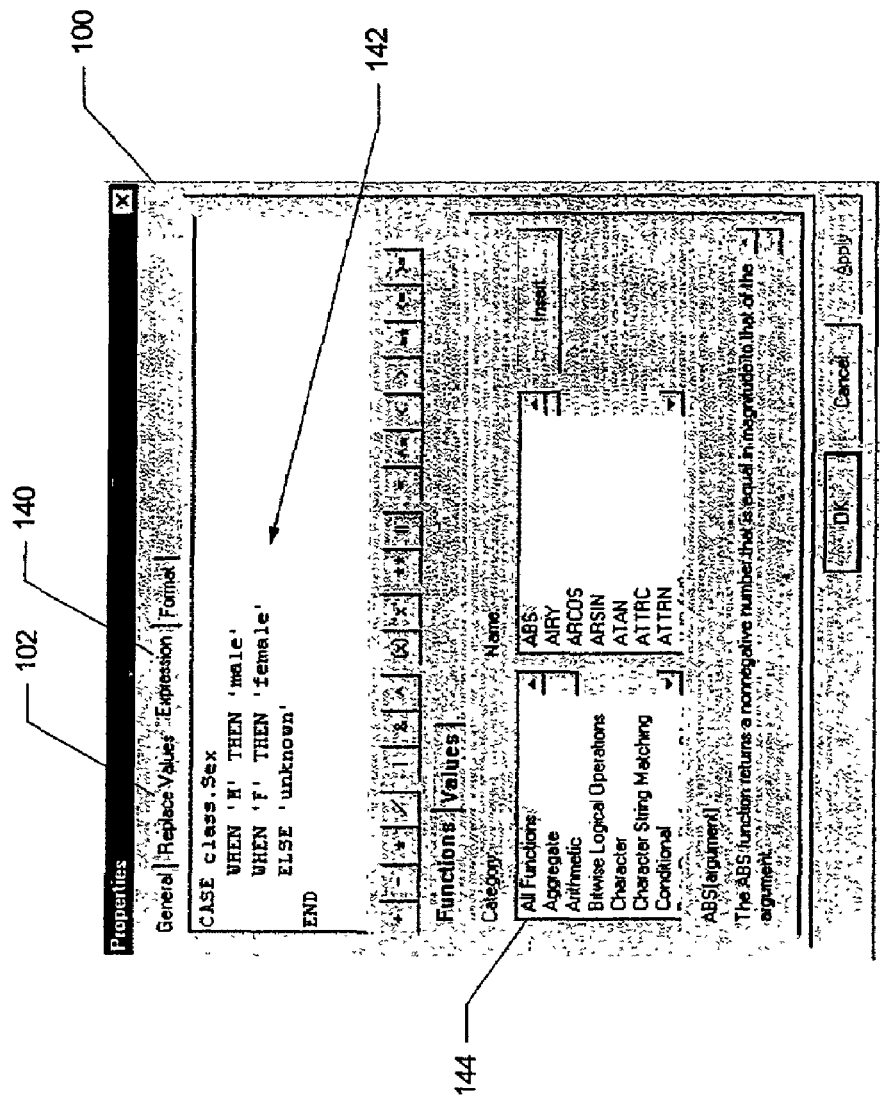
FIG. 6 is a graphical user interface showing the corresponding structured query language (SQL) code for the replacement value specified in the graphical user interface of FIG. 5.

After the user indicates which value or ranges of values are to be replaced, the user can optionally select the expression tab 140 to see the CASE statement 142 shown in FIG. 6. The CASE statement 142 is automatically created for the user based upon the information supplied under the replace values tab 102. If they chose, they can edit the CASE statement 142. Modifications to the generated CASE statement 142 are automatically reflected back within the replacement list 118 provided under the replace values tab 102. They then can continue and submit their query.

As shown within the CASE statement 142, the entire syntax has been generated for the user. In this example, the table name and field name combination were automatically taken into account in forming the statement's "class.Sex" entry. Similarly, the statement's WHEN portions were automatically formed to properly replace the old values of "M" and "F" with their respective replacement values of "male" and "female". The statement's ELSE portion was automatically formed with the "unknown" value as specified earlier under the replace values tab 102. The statement terminates with the END term in order to properly conform to the ANSI SQL CASE statement syntax.

As further shown in FIG. 6, the user can access functions 144 that may be added to the CASE statement 142. The user may wish to apply a function 144 to a column specified in the CASE statement 142. For example, an upper case string conversion function can be applied to the column "class.Sex" so that the WHEN comparisons in the CASE statement 142 are not case sensitive. The term "class.Sex" in the CASE statement 142 may be replaced by the following in order to accomplish this: "UCASE$(class.Sex)". It should be understood that the GUI provided under the replace values tab 102 may allow the user to specify that one or more functions are to be applied to a column. The GUI provided under the replace values tab 102 may provide a list of functions (such as the one provided at 144) to assist the user in correctly using the function(s). If the function is specified in the GUI provided under the replace values tab 102, then the expression within the GUI provided under the expression tab 140 is shown with the function. If the function is specified in the GUI provided under the expression tab 140, then the interface region of the GUI provided under the replace values tab 102 shows the function being applied to the column.

Figure 7:
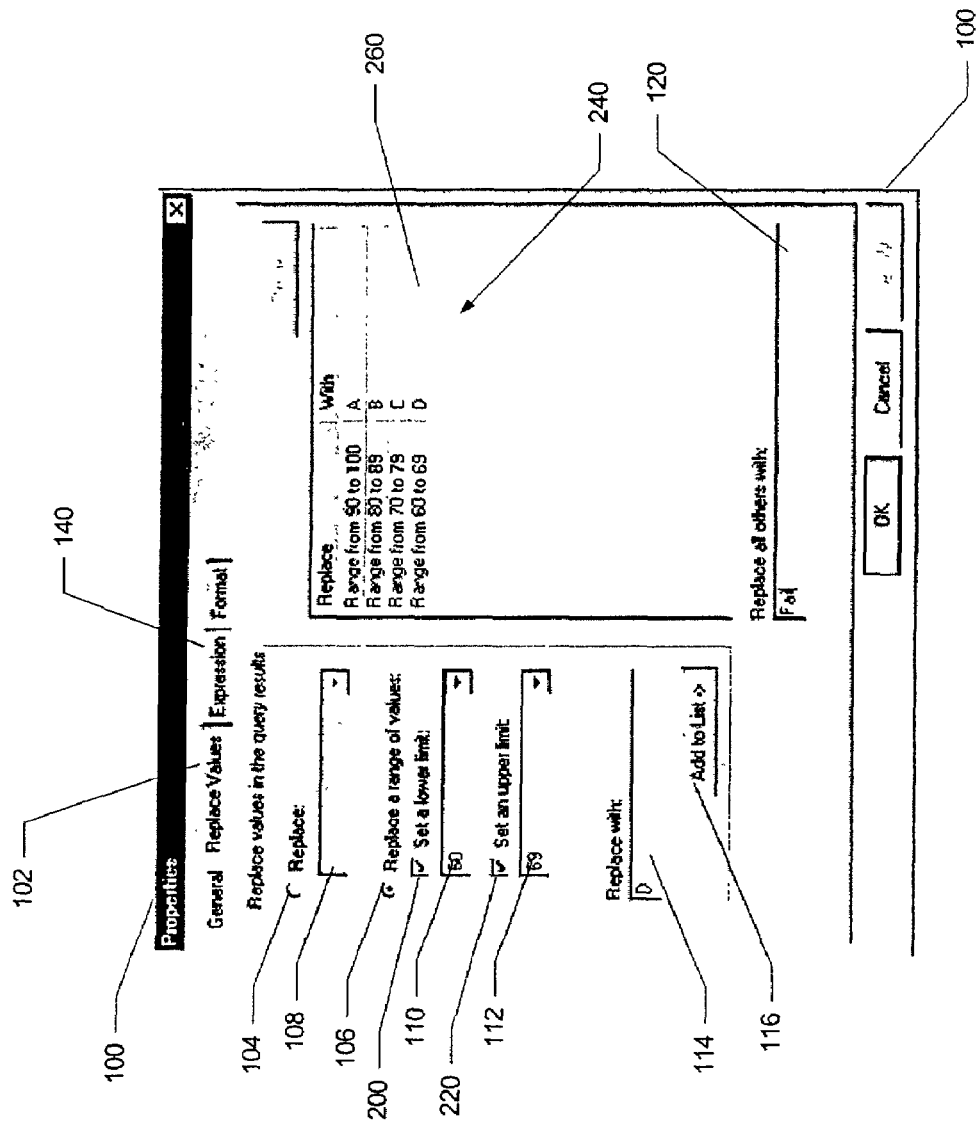
FIG. 7 is a graphical user interface illustrating an example of replacing ranges of data values.

FIG. 7 illustrates an example of replacing ranges of data values. With reference to FIG. 7, the query results' data in this example has a column named Score containing test scores. A user might want to replace the test scores between 90 and 100 with a letter grade of "A", the scores between 80 and 89 with a grade of "B", and so on. Under the replace values tab 102 in the GUI 100, the user can select or type the upper and the lower limits for a range. Users may set either a lower limit or an upper limit or they can assign both.

In this example, the user has selected radio button 106 to indicate that a range of values is to be replaced. Check box 200 has been activated so that the user may select from a list of values a lower limit in pull down list 110 or may manually type in a lower limit in the list 110. The list of values provided to the user are obtained from the query results' data.

Check box 220 has been activated so that the user may select from a list of values an upper limit in pull down list 112 or may manually type in an upper limit in the list 112. The list of values provided to the user are obtained from the query results' data.

The user has specified (at 110) a lower limit of 60 and (at 112) an upper limit of 69. The user has specified (at 114) a replacement value of "D" and has clicked the button 116 to add the values to the replacement list 240. The values are placed in row 260 to indicate that any numbers in the Score column that are inclusively within the range of 60 to 69 will be replaced with the value of "D".

It is noted that the user has specified a default value at 120 that will be assigned to all columns whose values do not match any of the specified ranges of values. In this example, all scores below 60 are replaced with "Fail". It is further noted that rows which specify replacement of discrete values may be contained within the same replacement list 240 as rows that specify replacement of a range of values.

Figure 8:
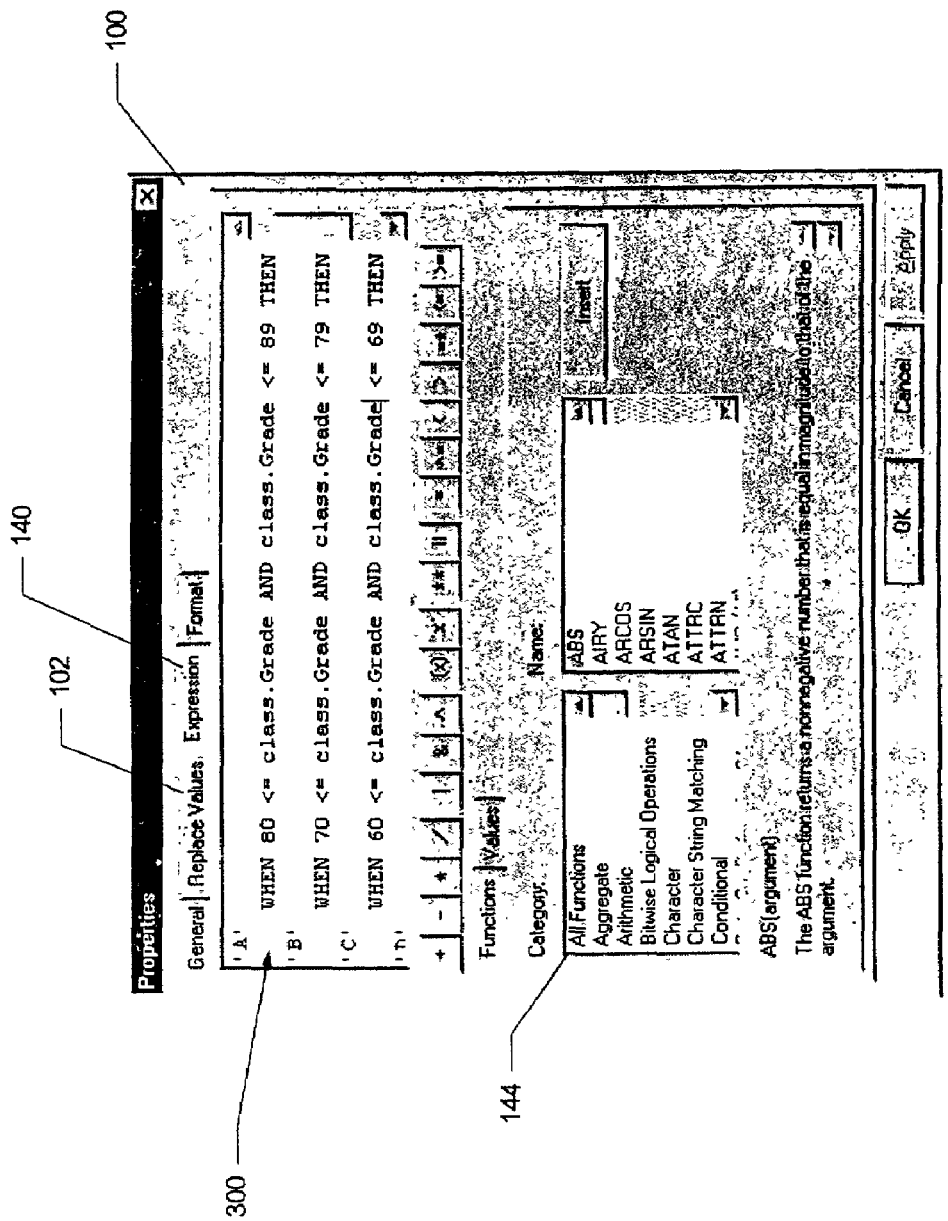
FIG. 8 is a graphical user interface depicting the SQL code associated with the replacement values specified in the graphical user interface of FIG. 7.

After the user specifies the ranges and their replacement values, the user can select the expression tab 140 in the GUI 100 to see the SQL CASE statement 300 that is automatically generated for them and that corresponds to what they specified in the GUI 100 of FIG. 7. With reference to FIG. 8, the SQL CASE statement 300 is shown that will perform a replacement for the ranges of values in the Score column. If the user prefers, they can edit the generated CASE statement 300 in the expression tab 140. Otherwise, the user can continue and submit their query.

Figure 9:
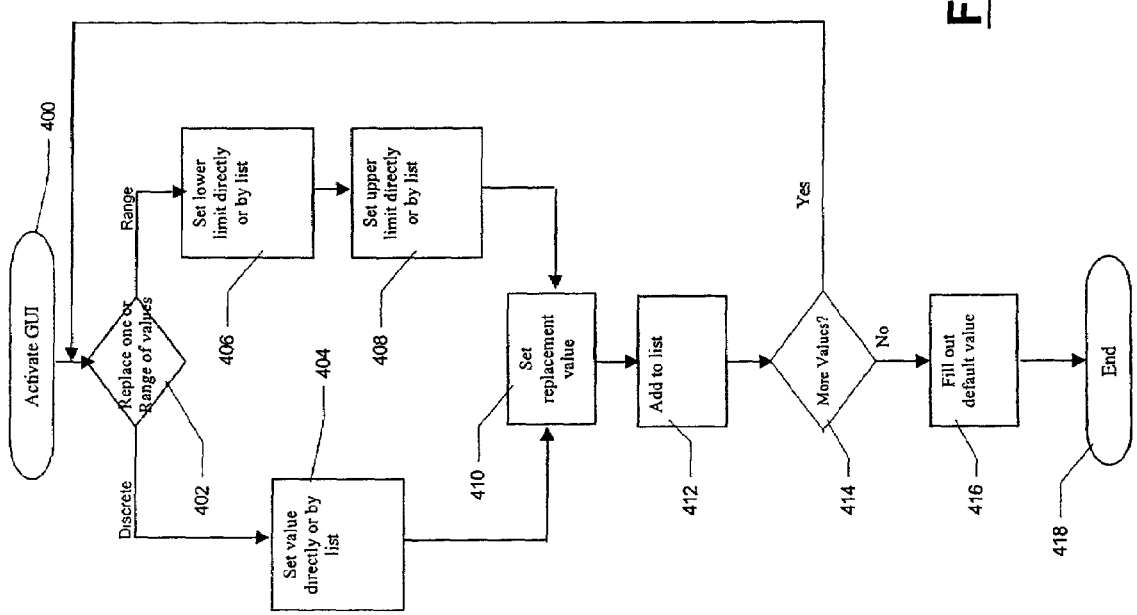
FIG. 9 is a flowchart depicting steps that the replacement graphical user interface system may utilize in interacting with a user.

FIG. 9 depicts steps that a data replacement graphical user interface system may utilize in interacting with a user. With reference to FIG. 9, a user activates the data replacement graphical user interface system at process block 400. Decision block 402 examines whether a user wishes to replace one data value (i.e., a discrete value) or a range of data values. If the user wishes to set a discrete value (or values), the user specifies which discrete data values are to be replaced at process block 404. This may be done in a number of ways such as setting the value to be replaced directly or through a list provided by the graphical user interface of possible data values associated with a particular column. After the data value to be replaced is specified, then the user sets the replacement value at process block 410. At process block 412, both the original data value and the replacement value are added to the replacement list of the graphical user interface.

If the user at decision block 402 had specified that a range of values is to be replaced, then processing would continue at process block 406. At process block 406, the user sets the lower limit by directly specifying the lower limit or by the graphical user interface providing a list of possible lower limit ranges that the user can use. Correspondingly, at process block 408, the user sets the upper limit either directly or by a list provided by the graphical user interface. At process block 410, the replacement value(s) for one or more of the ranges are set at process block 410. Both the original data values and the replacement data values are added to the replacement list at process block 412.

If the user wishes to add still more values for replacement as determined by decision block 414, then processing returns to decision block 402 so that the user can specify additional data values to be replaced. However, if the user has finished specifying values to be replaced, then processing continues at process block 416. At process block 416, the user is given the option as to whether a default value is to be used in the event that certain data values in the query results do not match any replacement criteria specified in the preceding steps. The replacement graphical user interface operations then complete at end block 418.

Figure 10:
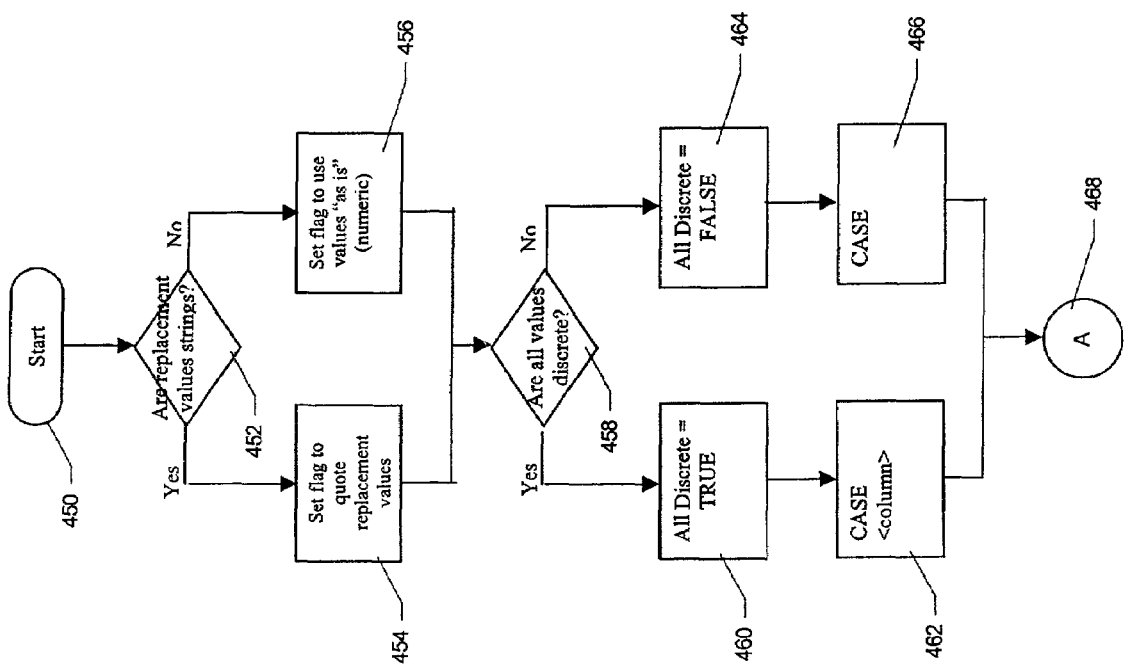
FIGS. 10-12 are flowcharts depicting steps to construct an SQL statement in accordance with replacement values specified by a user through the replacement graphical user interface system.
Figure 11:
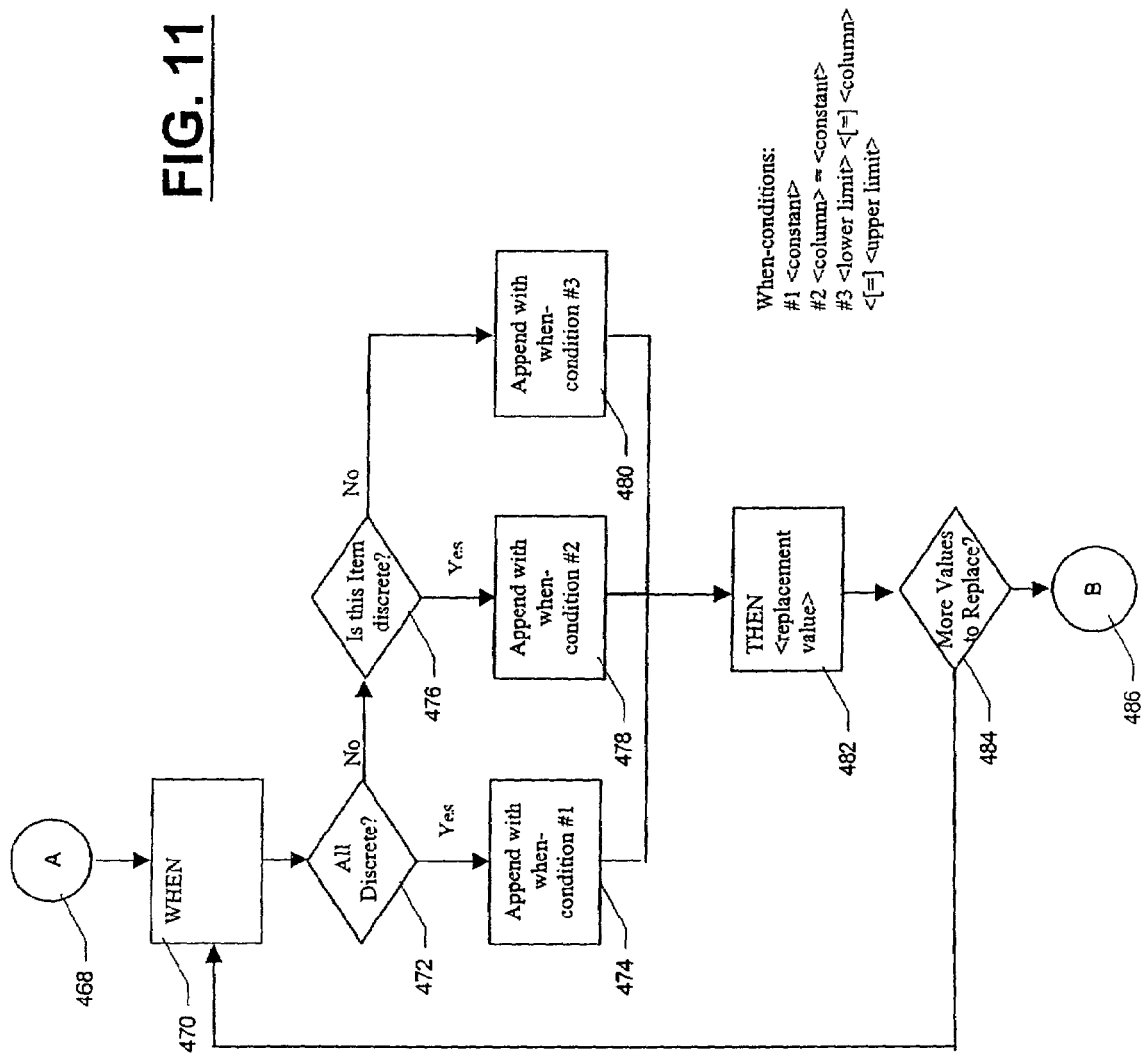
Figure 12:
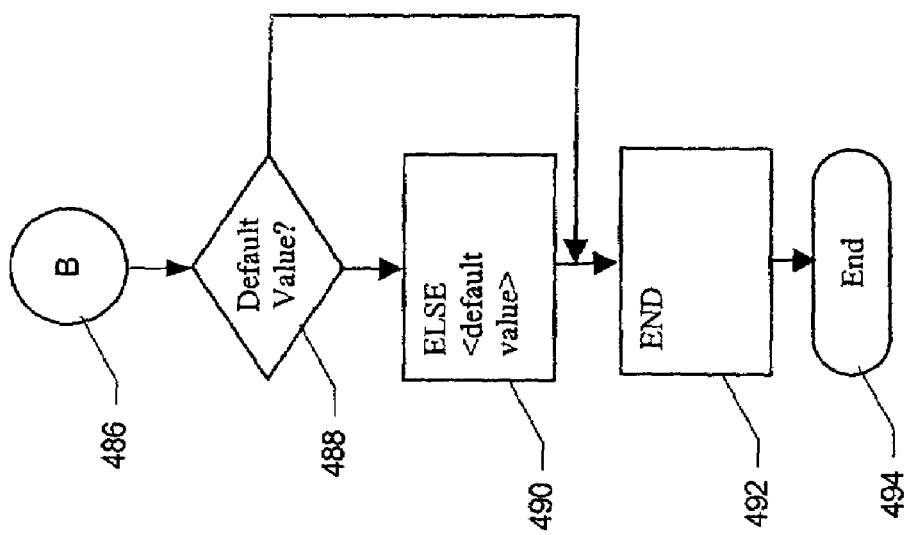

FIGS. 10-12 depict steps that may be used to construct an SQL statement in accordance with replacement values specified by a user through the replacement graphical user interface system. With reference to decision block 452 on FIG. 10, the system examines whether any of the specified replacement values are text or string values. If they are, then process block 454 sets a flag so that the text replacement values are enclosed within quotation marks. However, if the replacement values are not text or strings as determined by decision block 452, then process block 456 sets a flag to use the values without enclosing the values within quotation marks.

If all the values are discrete as determined by decision block 458, then process block 460 sets a flag to a true value to indicate that all the values are discrete. Process block 462 performs a syntax generation operation by creating the initial portion of the SQL CASE statement by writing "CASE <column>" where "<column>" indicates the column within the query results whose one or more values are to be replaced.

If the values are not all discrete as determined by decision block 458, then process block 464 sets the flag's default, and process block 466 constructs the initial portion of the SQL case statement with the string "CASE". Processing continues on FIG. 11 as indicated by continuation block 468.

With reference to FIG. 11, process block 470 appends the SQL term "WHEN" to the portion of the case statement already constructed by either process block 462 or process block 466. The case statement is further constructed through the following process. Decision block 472 examines whether all the replacement values are discrete. If they are, then process block 474 appends the already constructed SQL CASE statement with the "WHEN condition" suitable for data values that are all discrete. Such a suitable format would include appending the constant discreet values to the already constructed SQL CASE statement. An example where all replacement expressions are discrete is the following:

```
CASE class.Age
    WHEN 11 THEN 'eleven'
    WHEN 12 THEN 'twelve'
    WHEN 13 THEN 'thirteen'
    WHEN 14 THEN 'fourteen'
    WHEN 15 THEN 'fifteen'
    WHEN 16 THEN 'sixteen'
    ELSE 'unknown'
END
```

If the replacement values are not all discrete as determined by decision block 472, then decision block 476 is performed. Decision block 476 examines whether a specific item to be replaced is discrete. If it is, then process block 478 appends the already constructed case statement with a WHEN condition suitable for such a situation. An example of a mixture of discrete and range replacement expressions is contained in the following:

```
CASE
    WHEN 11 <= class.Age AND class.Age <= 12 THEN 'Middle
    School'
    WHEN 13 <= class.Age AND class.Age <= 14 THEN 'Jr. High'
    WHEN 15 = class.Age THEN 'Sophomore'
    WHEN 16 = class.Age THEN 'Junior'
END
```

If the current data item is not discrete as determined by the decision block 476, then process block 480 appends the already constructed case statement with a WHEN condition that is suitable for a non-discrete data item. In such a situation, the following may be used: "<lower limit><[=]<column>< [=]<upper limit>". An example where all replacement expressions are ranges is contained in the following:

```
CASE
    WHEN 11 <= class.Age AND class.Age <= 12 THEN
    'Middle School'
```

```
    WHEN 13 <= class.Age AND class.Age <= 14 THEN 'Jr. High'
    WHEN 15 <= class.Age AND class.Age <= 17 THEN 'High School'
END
```

After the WHEN conditions have been appended to the case statement, process block 482 further appends a "THEN" portion to the SQL CASE statement under construction. A format that process block 482 may use is the following: "THEN <replacement value>". Decision block 484 examines whether any more values specified by the user need to be replaced. If so, then processing returns to decision block 470 so that the next data item may be processed. However, if no more values are to be processed as determined by the decision block 484, then processing continues on FIG. 12 as indicated by continuation block 486.

With reference to FIG. 12, decision block 488 examines whether the user has specified a default value. If the user has specified a default value, then process block 490 appends to the SQL CASE statement under construction, the "ELSE" portion. Process block 490 may use the following format: "ELSE <default value>". Process block 492 then completes the SQL CASE statement construction operation by appending the word "END" to the SQL CASE statement under construction.

If the user had not specified a default value as determined by decision block 488, then processing proceeds to process block 492 to append the "END" to the SQL CASE statement under construction. Processing then terminates at end block 494.

Figure 13:
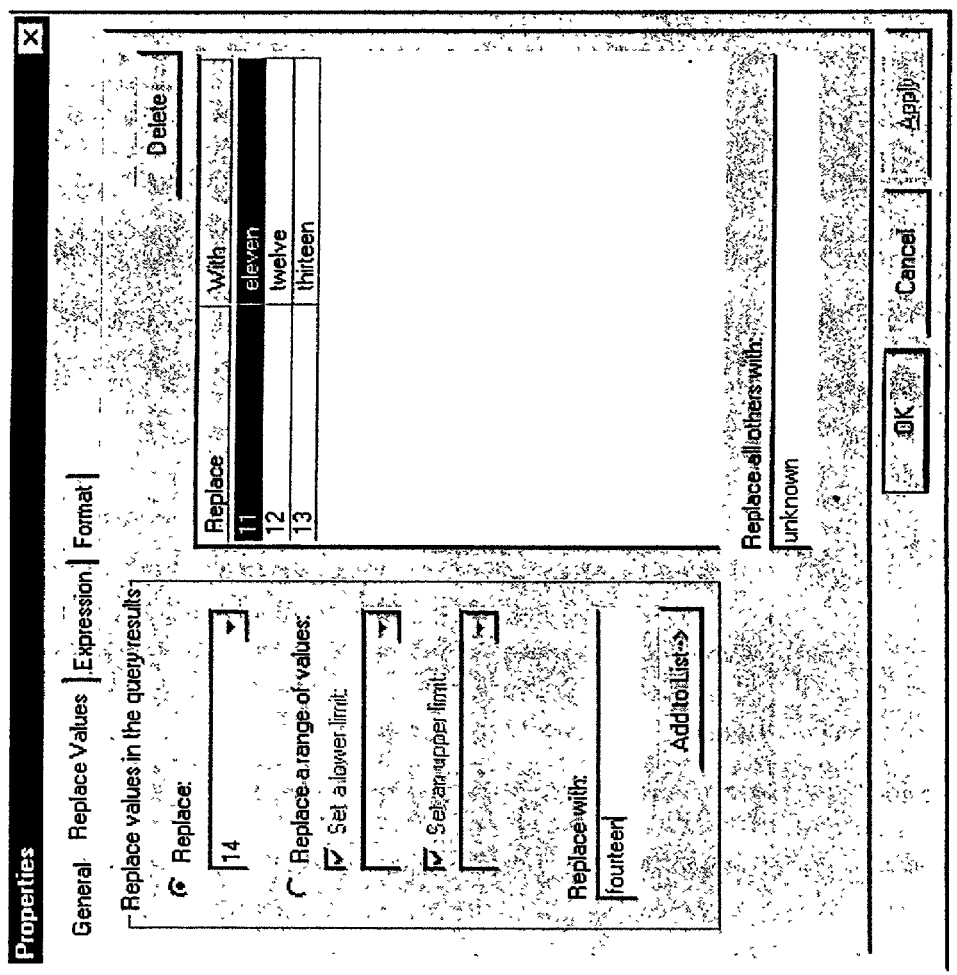
FIG. 13 is a graphical user interface illustrating an example where data of one type is replaced with data of a second type.

While examples have been used to disclose the invention, including the best mode, and also to enable any person skilled in the art to make and use the invention, the patentable scope of the invention is defined by the claims, and may include other examples that occur to those skilled in the art. For example, FIG. 13 illustrates where data of one type is replaced with data of a second type. The query results' original data values as depicted in FIG. 13 are of a numeric integer type. The user has specified through the GUI that the discrete numeric data values are to replaced with the text values shown in the replacement values column.

Such functionality may be used as a way to reduce database storage space, while displaying data to end users in meaningful terms. For example numeric codes may be stored in a database representative of company department descriptions. Numeric codes require less space than company department text identifiers. The GUI can be used to translate the numeric codes to a more understandable text description when department information is to be displayed in a software application.

Figure 14:
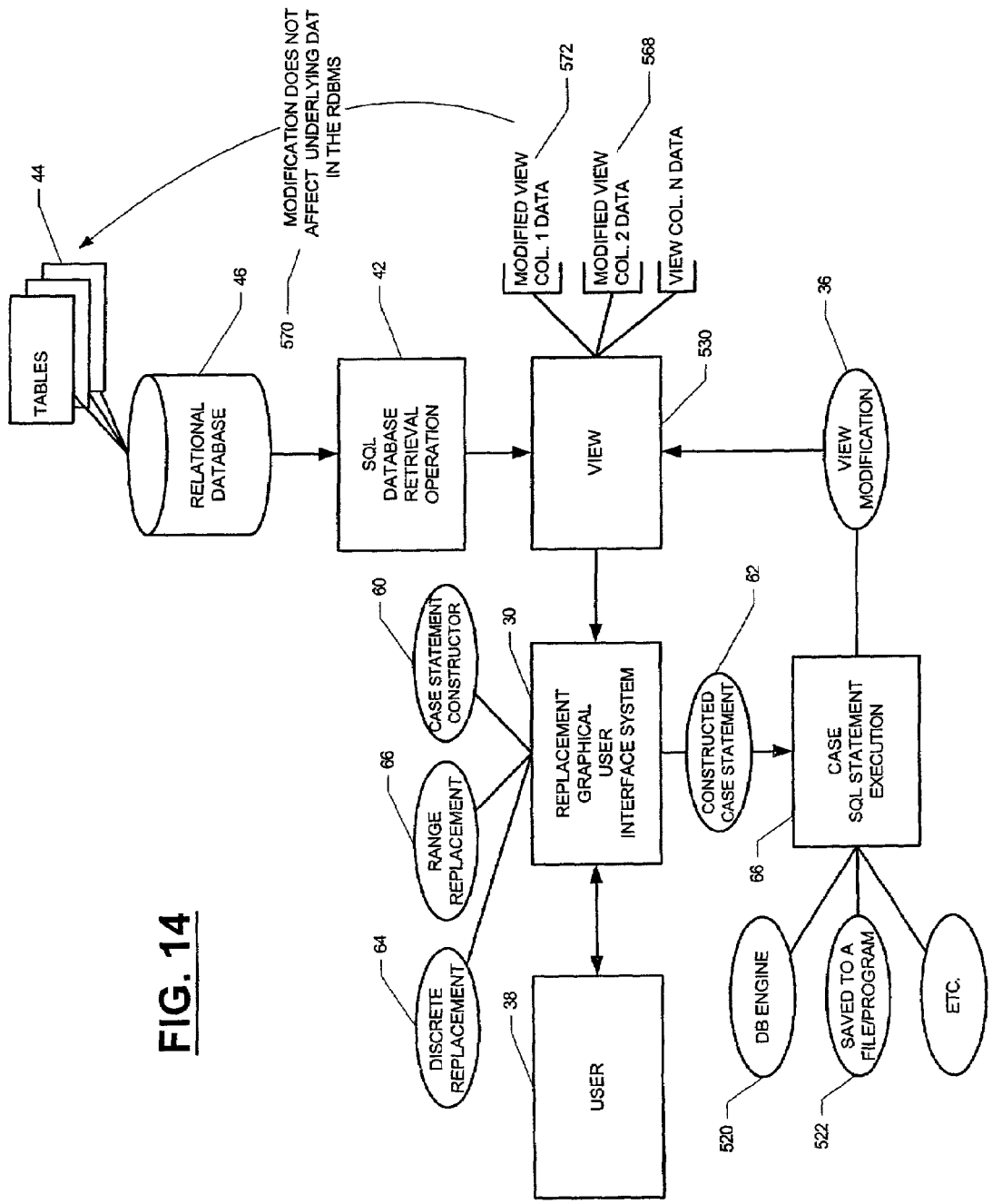
FIG. 14 is a block diagram depicting exemplary execution situations involving the replacement graphical user interface system.

As yet another example of the many applications and extensions of the system, FIG. 14 depicts exemplary execution situations involving the replacement graphical user interface system. For example, a constructed CASE statement 62 may be executed by a database engine 520 directly after its creation or the constructed CASE statement may be saved to a storage location 522 for later use. Still further, the user can insert the constructed CASE statement directly into a computer program 522. The CASE statement will then be invoked during the program's execution. Other ways for executing the constructed CASE statement may be used depending upon the situation at hand.

Still further, FIG. 14 illustrates that the system 30 may be used to construct CASE statements for use in database operations wherever the CASE statement is permitted to be used within SQL to replace data values. For example, the CASE statement may be used to change data values within an SQL view. In SQL, a view 530 is a virtual table derived directly or indirectly from tables 44 contained in a database 46. A view 530 may be defined to omit some data from a table (for privacy), or to combine two or more tables, or to contain summary data, or for other reasons. A view 530 is created by the SQL CREATE VIEW statement. Additional parameters may be specified in the CREATE VIEW statement, such as specifying the table columns or fields as well as filter conditions.

As shown in FIG. 14, the user has specified that data values contained in the first and second columns (568 and 572) of the view 530 are to be replaced. The SQL CASE constructor module 60 generates a CASE statement to modify accordingly the data values contained in these columns (568 and 572). It is noted at 570 that the modification of column 1's and column 2's data values does not affect the data values in the underlying table(s) 44 that were used to create the view 530.

It is noted that the system and method may be implemented on various types of computer architectures, such as for example on a single general purpose computer or workstation, or on a network (e.g., local area network, wide area network, or internet), or in a client-server configuration, or in an application service provider configuration. Also, the system's and method's data (such as the data specified through the GUI for constructing the SQL CASE statement) may be stored as one or more data structures in computer memory depending upon the application at hand. The system and method may be provided on many different types of computer readable media including instructions being executable by a computer to perform the system and method operations described herein, such as for example to generate replacement GUIs and construct SQL CASE statements.

Computer components, software modules, functions and data structures described herein may be connected directly or indirectly (or in whatever manner) to each other in order to allow the flow of data needed for their operations. It is also noted that a module includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

What is claimed as the invention is:

1. A computer-implemented graphical user interface for modifying, through a Structured Query Language (SQL) CASE statement, data contained within query results, comprising:

instructions stored in a computer-readable storage medium and executable on one or more processors to generate:

a first interface region that displays at least one data value from the query results, the query results being created by an SQL SELECT statement database retrieval operation containing column parameters and filter parameters, the query results including current column data values resulting from execution of the SQL SELECT statement;

a second interface region that allows a user to specify a replacement column data value for a current column data value displayed in the query results, wherein the replacement column data value is a substitute for the current column data value displayed in the query results; and an SQL CASE statement construction module having a data connection to the second interface region, the SQL CASE statement construction module generating an SQL CASE statement based upon the replacement column data value specified in the second interface region, wherein the current column data value displayed in the query results is modified based upon execution of the generated SQL CASE statement.

2. The computer-implemented graphical user interface of claim 1, wherein the query results contain data derived from a relational database system.

3. The computer-implemented graphical user interface of claim 1, wherein a view is created from the query results, wherein the view is a virtual table derived from at least one table from a relational database system.

4. The computer-implemented graphical user interface of claim 1, wherein the data values contained within the query results are based upon data values correspondingly contained within a database, and wherein the generated SQL CASE statement modifies the current column data value in the query results without modifying the corresponding data value in the database.

5. The computer-implemented graphical user interface of claim 1, wherein a view is created from the query results, wherein the data values contained within the view are based upon data values correspondingly contained within a database, and wherein the generated SQL CASE statement modifies the data value in the view without modifying the corresponding data value in the database.

6. The computer-implemented graphical user interface of claim 5, wherein the data values contained within the view are created based upon an SQL database retrieval operation that operates upon data values contained within the database.

7. The computer-implemented graphical user interface of claim 5, wherein the data values contained within the view are created based upon an SQL CREATE VIEW operation that operates upon data values contained within the database.

8. The computer-implemented graphical user interface of claim 5, wherein the data values contained within the view are created based upon an SQL SELECT operation that operates upon data values contained within the database.

9. The computer-implemented graphical user interface of claim 1, wherein the user is allowed to select within the first interface region current values associated with a column in the query results.

10. The computer-implemented graphical user interface of claim 1, wherein the user is allowed to select within the first interface region current data values associated with a column in the query results, thereby relieving the user from needing to know valid column data values for assigning replacement column data values.

11. The computer-implemented graphical user interface of claim 1, wherein the first interface region displays the current column data value selected by the user for replacement within the query results.

12. The computer-implemented graphical user interface of claim 1, wherein the current column data value displayed in the query results is part of a data range selected by the user for replacement within the query results.

13. The computer-implemented graphical user interface of claim 1, wherein the user is allowed to select the current column data value from the query results by activating a graphical user interface control on the second interface region.

14. The computer-implemented graphical user interface of claim 1, wherein the user is allowed to select the replacement column data value by manually typing a data value.

15. The computer-implemented graphical user interface of claim 1, wherein the first interface region displays a data range selected by the user for replacement within the query results.

16. The computer-implemented graphical user interface of claim 1, wherein the first interface region displays a data range selected by the user through a graphical user interface control for replacement within the query results.

17. The computer-implemented graphical user interface of claim 1, wherein the computer-implemented graphical user interface displays in a tabular format, the current column data value and the replacement column data value for the current column data value displayed in the query results.

18. The computer-implemented graphical user interface of claim 1, wherein the computer-implemented graphical user interface displays in a tabular format, the current column data values and replacement column data values for the current column data values displayed in the query results.

19. The computer-implemented graphical user interface of claim 1, wherein the computer-implemented graphical user interface displays in a tabular format, data ranges and replacement values for the displayed data ranges.

20. The computer-implemented graphical user interface of claim 1, further comprising:
a plurality of windows, wherein the first interface region is contained on a first window and the second interface region is contained in a second window.

21. The computer-implemented graphical user interface of claim 20, wherein a wizard guides a user through the first window and the second window.

22. The computer-implemented graphical user interface of claim 1, wherein the first interface region and the second interface region are contained within a same interface window.

23. The computer-implemented graphical user interface of claim 1, further comprising:
graphical user interface controls associated with the first interface region wherein the user selects at least one data value to replace within the query results, and wherein a list of functions is provided by the first interface wherein the user is allowed to use a function with respect to a column wherein data values are subject to replacement.

24. The computer-implemented graphical user interface of claim 1, further comprising graphical user interface controls associated with the second interface region wherein the user may specify the replacement column data value.

25. The computer-implemented graphical user interface of claim 1, further comprising:
a third interface region wherein the third interface region allows the user to specify that discrete data values in the query results that are to be replaced.

26. The computer-implemented graphical user interface of claim 1, wherein the user is allowed to provide through the computer-implemented graphical user interface a discrete value which is the replacement column data value.

27. The computer-implemented graphical user interface of claim 1, wherein the user is allowed to provide through the computer-implemented graphical user interface a range for the data values which are replaced within the query results.

28. The computer-implemented graphical user interface of claim 1, wherein the user is allowed to provide through the computer-implemented graphical user interface, a range for the data values within the query results, wherein the range of data values are replaced by a replacement column data value.

29. The computer-implemented graphical user interface of claim 1, wherein the first interface region allows the user to select the current column data values from the query results,
wherein the second interface region allows the user to specify replacement column data values for the selected current column data values from the query results, wherein the SQL CASE statement construction module generates the SQL CASE statement based upon the replacement column data values specified in the second interface region, and wherein current column data values contained in the query results are replaced with the replacement column data values based upon execution of the generated SQL CASE statement.

30. The computer-implemented graphical user interface of claim 29, wherein the replacement column data value is a string value, and wherein the SQL CASE statement construction module generates the SQL CASE statement wherein the string value is enclosed within quotation marks.

31. The computer-implemented graphical user interface of claim 29, wherein the SQL CASE statement construction module generates column information thereby conforming to SQL CASE syntax, to append to a case term.

32. The computer-implemented graphical user interface of claim 29, wherein the SQL CASE statement construction module generates a WHEN portion to place after a case term based upon query results including the current column data values specified through the computer-implemented graphical user interface.

33. The computer-implemented graphical user interface of claim 32, wherein the SQL CASE statement construction module generates a THEN portion to place after the WHEN portion based upon the replacement column data values specified through the computer-implemented graphical user interface.

34. The computer-implemented graphical user interface of claim 33, wherein the SQL CASE statement construction module generates an ELSE portion to place after the THEN portion based upon a default value specified through the computer-implemented graphical user interface.

35. The computer-implemented graphical user interface of claim 33, wherein the SQL CASE statement construction module generates an END term to place after the WHEN portion in order to have the generated SQL CASE statement conform to SQL CASE syntax.

36. The computer-implemented graphical user interface of claim 29, wherein the SQL CASE statement construction module generates a case term based upon the replacement column data values specified through the computer-implemented graphical user interface.

37. The computer-implemented graphical user interface of claim 1, wherein the computer-implemented graphical user interface allows the user to provide through the computer-implemented graphical user interface a discrete value which is the replacement column data value for the current column data value displayed in the query results, wherein the computer-implemented graphical user interface allows the user to provide a range of data values which are replaced by a replacement column data value, and wherein the SQL CASE statement construction module generates an SQL CASE statement based upon the provided discrete value and the range of data values.

38. The computer-implemented graphical user interface of claim 37, wherein execution of the generated SQL CASE statement modifies data contained within the query results.

39. The computer-implemented graphical user interface of claim 1, wherein execution of the generated SQL CASE statement modifies data contained within multiple columns of the query results.

40. The computer-implemented graphical user interface of claim 1, wherein execution of the generated SQL CASE statement modifies data contained within the query results, and wherein the execution is performed by a database engine.

41. The computer-implemented graphical user interface of claim 1, wherein the generated SQL CASE statement is stored in a file.

42. The computer-implemented graphical user interface of claim 1, wherein the generated SQL CASE statement is inserted into a computer program.

43. The computer-implemented graphical user interface of claim 1, wherein computer memory contains storage locations for storing a data structure, the data structure comprising storage locations for the current column data value displayed through the first interface region and for the replacement column data value specified through the second interface region, the SQL CASE statement construction module having a data connection to the data structure wherein the SQL CASE statement construction module generates the SQL CASE statement.

44. The computer-implemented graphical user interface of claim 1, wherein a view is created from the query results, wherein the view is a virtual table derived from tables from a relational database system, and wherein the computer-implemented graphical user interface utilizes data structure information of the tables to display at least one data value from the view.

45. The computer-implemented graphical user interface of claim 1, wherein a view is created from the query results, wherein the view is a virtual table derived from tables in a relational database system, and wherein the SQL CASE statement construction module utilizes data structure information of the tables to generate the SQL CASE statement.

46. The computer-implemented graphical user interface of claim 45, wherein the data structure information is selected from a group consisting of table column names, replacement values, column data types, and combinations thereof.

47. The computer-implemented graphical user interface of claim 1, wherein a view is created from the query results, wherein the current column data and replacement column data values corresponding to the view and specified through the computer-implemented graphical user interface, are of different data types.

48. The computer-implemented graphical user interface of claim 47, wherein the view is created from the query results, and wherein database storage requirements for current data corresponding to the view, are less than database storage requirements for the replacement data values specified through the computer-implemented graphical user interface.

49. The computer-implemented graphical user interface of claim 48, wherein the view is created from the query results, and wherein execution of the generated SQL CASE statement replaces numeric code values in the view with textual data values.

50. The computer-implemented graphical user interface of claim 1, further comprising:

a third interface region wherein the generated SQL CASE statement is may be modified prior to execution, and wherein a list of functions provided by the third interface allows the user to use a function with respect to a column specified in the generated SQL CASE statement.

51. The computer-implemented graphical user interface of claim 1, wherein a view is created from the query results, and wherein the computer-implemented graphical user interface allows the user to specify a default value to use as a replacement value when a match is not achieved between view data values specified through the computer-implemented graphical user interface and data values contained in the view.

52. A computer-implemented method for modifying data contained within query results via a Structured Query Language (SQL) CASE statement using a graphical user interface, comprising:
  executing software instructions on one or more processors to display to a user at least one data value from the query results, the query results being created by an SQL SELECT statement database retrieval operation containing column parameters and filter parameters, the query results including current column data values resulting from execution of the SQL SELECT statement;
  executing software instructions on the one or more processors to allow the user to specify within graphical user interface, a replacement column data value for the current column data value displayed in the query results; and
  executing software instructions on the one or more processors to automatically generate an SQL CASE statement based upon the replacement column data value specified through the graphical user interface,
  wherein a column data value contained in the query results is modified based upon execution of the generated SQL CASE statement.

53. The computer-implemented method of claim 52, wherein the query results are from a view.

54. The computer-implemented method of claim 53, wherein the data values contained within the view are based upon data values correspondingly contained within a database, and wherein the automatically generated SQL CASE statement modifies the data value in the view without modifying the corresponding data value in the database.

55. Computer software stored on a computer readable media, the computer software comprising program code for carrying out the computer-implemented method according to claim 52.

56. A computer-implemented system for modifying data contained within query results via a Structured Query Language (SQL) CASE statement, comprising:
  a processor;
  a computer-readable storage medium containing software instructions which are executed by the processor to perform operations including;
  first software instructions to display to a user at least one data value from the query results, the query results being created by an SQL SELECT statement database retrieval operation containing column parameters and filter parameters, the query results including column data values resulting from execution of the SQL SELECT statement;
  second software instructions to allow the user to specify within a graphical user interface a replacement column data value for a column data value from the query results, wherein the replacement column data value is a string value;
  third software instructions to automatically generate an SQL CASE statement based upon the replacement column data value specified through the graphical user interface, wherein the SQL CASE statement generates the string value which is enclosed within quotation marks; and
  wherein the column data value contained in the query results is modified based upon execution of the generated SQL CASE statement, without modifying a corresponding data value in a relational database.

57. A computer-implemented graphical user interface for modifying, through a Structured Query Language (SQL) CASE statement, data contained within query results, comprising:
  instructions stored in a computer-readable storage medium and executed on one or more processors to generate:
  a first interface region that includes a plurality of selectable column data values from the query results, the query results including column data values resulting from execution of an SQL SELECT statement, each of the selected column data values having multiple occurrences within the query results;
  a second interface region that receives a replacement column data value in order to substitute a selected one of the plurality of selectable column data values of the first interface region with the replacement column data value of the second interface region;
  a third interface region that displays a selectable column data value from the first interface region and a corresponding replacement column data value from the second interface region; and
  an SQL CASE statement construction module for generating an SQL CASE statement based upon the replacement column data value specified in the second interface region,
  wherein the replacement column data value contained in the query results is modified based upon execution of the generated SQL CASE statement, without modifying a corresponding data value in a relational database.

58. The computer-implemented graphical user interface of claim 57, further comprising a user interface control, the user interface control configured to add the selected column data value and the corresponding replacement column data value to the third interface region.

* * * * *

UNITED STATES PATENT AND TRADEMARK OFFICE
CERTIFICATE OF CORRECTION

| | |
|---|---|
| PATENT NO. | : 7,634,460 B2 |
| APPLICATION NO. | : 10/186224 |
| DATED | : December 15, 2009 |
| INVENTOR(S) | : Thorne et al. |

Page 1 of 1

It is certified that error appears in the above-identified patent and that said Letters Patent is hereby corrected as shown below:

In column 10, line 34, insert a --,-- after the word "region".

In column 10, line 46, delete the word "that".

In column 12, line 57, delete the words "may be".

In column 13, line 14, insert --the-- after the word "within".

Signed and Sealed this

Sixth Day of April, 2010

David J. Kappos
*Director of the United States Patent and Trademark Office*